Patented May 13, 1952

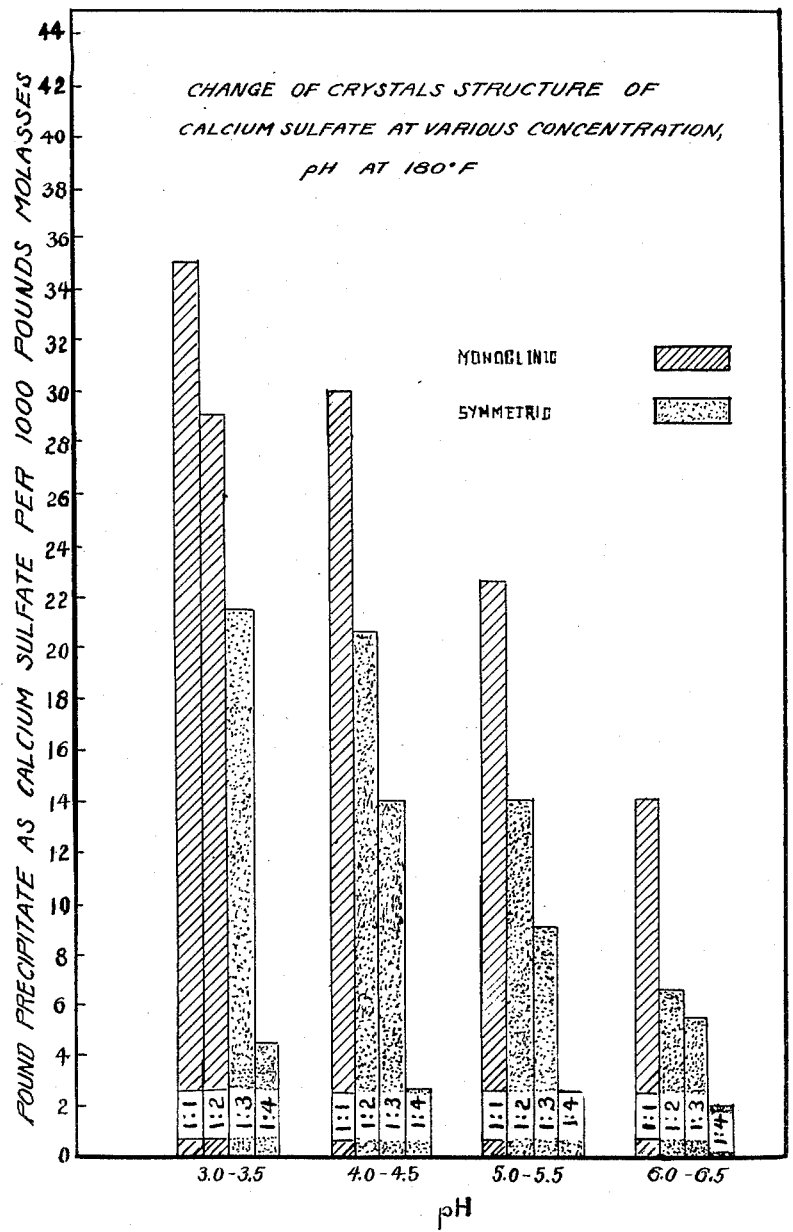

2,596,599

UNITED STATES PATENT OFFICE 2,596,599

TREATMENT OF CARBOHYDRATE-CONTAINING LIQUIDS FOR REMOVAL OF ALKALINE EARTH COMPOUNDS

Gustave T. Reich, Philadelphia, Pa.

Application August 30, 1948, Serial No. 46,746

4 Claims. (Cl. 127—48)

This invention relates to a method of removing alkaline earth compounds from carbohydrate-containing liquids.

Carbohydrate-containing liquids such as molasses, glucose, saccharified wood waste, citrus juices, frequently contain rather large amounts of alkaline earth compounds, either naturally present in the raw materials or introduced during the processing operations by which the liquids are obtained. When such materials are subjected to further processing for the production of solvents, or food or feed products, for example, the presence of the alkaline earth compounds causes many operating difficulties, such as precipitating and contaminating the finished product, scaling upon evaporator surfaces during concentration, and generally increasing the cost of processing and decreasing the yield and quality of the finished product.

The invention particularly is concerned with the efficient and economical removal of lime from carbohydrate materials in which the lime may be present as inorganic salts, such as chloride, sulfate or carbonate, or combined with organic matter. Two factors are of prime importance in the removal of lime from such material by the use of a precipitant, the completeness of the precipitation and the ease of separation of the precipitate. Lime compounds in general are characterized by anomalous solubility properties, and these properties are further greatly complicated by the presence of large amounts of carbohydrates, salts and other substances.

It has now been found that by treating carbohydrate-containing liquids with sulfuric acid or water-soluble sulfates, such as ammonium sulfate, under carefully selected conditions of concentration, temperature, hydrogen ion concentration and time, it is possible to obtain greatly increased precipitation of the lime content as calcium sulfate in a form readily separable by centrifuging or filtration. It has been found that the best results as to both completeness of precipitation and ease of separation are obtained by treating the liquid at a concentration of about 35° to 55° Brix with sulfuric acid or a water-soluble sulfate at a pH of about 3.0 to about 5.0 and a temperature of about 160° to about 200° F. for about 45 to about 90 minutes. A preliminary clarification of the carbohydrate-containing liquid, for example by centrifuging to remove suspended organic material is frequently advantageous.

Under the specified conditions the calcium sulfate is precipitated as readily separable monoclinic crystals, while under conditions outside the specified ranges the calcium sulfate precipitates in a form difficult to separate, typically in the form of symmetrical crystals, and in greatly decreased amounts, so that large amounts of lime compounds are left in the material in solution or in a difficulty separable form whereby the subsequent processing of the material becomes more difficult and expensive, and the products obtained therefrom are contaminated and less valuable both because of lower yield and lower quality.

When molasses containing for instance 3% of lime (CaO) and is treated with sulfuric acid under specified conditions, it is possible to control the crystal structure of the precipitated calcium sulfate, which will permit the removal of the largest amount of precipitate in the most easily grown crystal form.

The drawing attached is a chart showing the formation of monoclinic and symmetric crystals in molasses under various conditions of acidity and concentration of the liquid at a temperature of 180° F. for a period of about 45 to about 90 minutes.

While the solubility of calcium sulfate in water is very small, it has been found that such is not the case with molasses. The drawing shows that at 1:1 dilution of molasses monoclinic crystals are formed regardless of the pH. With the exception of a 1:2 dilution at a pH of 3.–3.5, symmetrical crystals are formed at all other dilutions and acidities shown on the chart, indicating low calcium sulfate removal, i. e. greater solubility of the calcium sulfate.

It has been found that at the higher concentrations, larger calcium sulfate crystals are obtained that are easily removable from the molasses and are readily washed free of the adhering molasses.

With greater dilution and prolonged time over 90 minutes, the calcium sulfate obtained is symmetrical and is apt to redissolve thus nullifying the effort and expense incurred in the removal of the lime.

The advantage to be gained by the present process is that the crystal form is the criteria of the efficient removal of the lime and by controlling the crystal structure by altering the pH, concentration and time it is possible to obtain high purity liquids with a very low lime content.

The crystal formation also indicates whether we are able to remove at least 60 percent of lime as calcium sulfate or not.

This curve applies to regular blackstrap molasses. For other materials other variables of pH, time, temperature and concentration will apply but the principles remain the same.

Referring to the chart, at a 1:3 dilution, i. e. 1 part molasses to 3 parts water, add sufficient sulfuric acid to obtain a pH 4.0–4.5, heat the liquid to 180° F. (usually sulfuric acid is added to the hot dilute molasses) and maintain the liquid at this temperature for 45 to 90 minutes, well developed, not very large symmetrical calcium sulfate crystals are formed.

If a 1:1 dilution is used, large monoclinic crystals are formed under these conditions. When it comes to remove the crystals, it is found according to the chart that a 1:3 dilution yields 50% less than 1:1 dilution.

Should the same conditions be maintained for a prolonged period, say 3 hours, the crystals at 1:3 dilution when observed under the microscope are smaller than after 1 hour, indicating the phenomena of redissolving. That this actually is a fact, can be shown, that after 1 hour standing at 1:3 dilution, pH 4.0–4.5, 180° F., about 15 lbs. of calcium sulfate crystals can be removed per 1000 lbs. of molasses. After 3 hours standing only 12–13 lbs. of calcium sulfate can be removed, indicating the loss of CaSO4 by redissolving the formation of smaller size of crystals.

Moreover under the same conditions but at a dilution of 1:1 the amount of calcium sulfate precipitated in 1 to 3 hours is about the same, but the crystals obtained after 3 hours are larger in size.

Carbohydrate-containing liquids having a higher concentration than the specified range are diluted to bring them within the preferred range of concentration, while dilute liquids, for example, citric waste liquids, are concentrated, as by evaporation, to within the specified range.

For the purpose of illustration, a specific example of the application of the principles of the invention to the treatment of can molasses is given:

50,000 gallons of cane molasses having a density of 80° Brix and containing about 3% of lime (CaO) is mixed with water, about 50,000 gallons, to give a density of 40° Brix and clarified by centrifuging. After heating to about 180° F., the diluted solution is treated while hot with sufficient sulfuric acid (typically about 300 to 400 gallons of concentrated sulfuric acid) to give a pH of 3.5, and is then held at about 180° F. for one hour.

A readily separable precipitate of monoclinic crystals of calcium sulfate is thereby obtained which is easily removed in a centrifuge.

When the treated molasses is used for the production of alcohol by fermentation increased yields of alcohol are obtained with greatly improved operating conditions during both fermentation and subsequent operations of removing alcohol and further concentration of the slop. When used for the production of yeast improved yields of high quality yeast of good color and low ash content are obtained.

This application is a continuation-in-part of my application Serial No. 419,027 filed November 13, 1941, now U. S. Patent 2,448,051, issued August 31, 1948.

I claim:

1. The method of removing calcium compounds from carbohydrate-containing liquids which comprises treating the liquid at a concentration of from 35° to 55° Brix, at a temperature of from 160° to 200° F., and at a pH of from 3.0 to 5.0 with a precipitant selected from the group consisting of sulfuric acid and water soluble sulfates, for a period of from 45 to 90 minutes, to precipitate calcium sulfate in the form of well developed monoclinic crystals, and separating the precipitated calcium sulfate substantially all in the form of said monoclinic crystals from the liquid before any substantial redissolution of the precipitated calcium sulfate occurs.

2. The method of removing calcium compounds from carbohydrate-containing liquids which comprises treating the liquid at a concentration of about 40° Brix at a temperature of about 180° F., and at a pH of about 3.5, with sulfuric acid for a period of about one hour to precipitate calcium sulfate in the form of well developed monoclinic crystals, and separating the precipitated calcium sulfate substantially all in the form of said monoclinic crystals from the liquid before any substantial redissolution of the precipitated calcium sulfate occurs.

3. The method of removing calcium compounds from molasses which comprises treating the molasses at a concentration of from 35° to 55° Brix, at a temperature of from 160° to 200° F., and at a pH of from 3.0 to 5.0 with a precipitant selected from the group consisting of sulfuric acid and water soluble sulfates, for a period of from 45 to 90 minutes to precipitate calcium sulfate in the form of well developed monoclinic crystals, and separating the precipitated calcium sulfate substantially all in the form of said monoclinic crystals from the liquid before any substantial redissolution of the precipitated calcium sulfate occurs.

4. The method of removing calcium compounds from molasses which comprises treating the molasses at a concentration of about 40° Brix at a temperature of about 180° F., and at a pH of about 3.5, with sulfuric acid for a period of about one hour to precipitate calcium sulfate in the form of well developed monoclinic crystals, and separating the precipitated calcium sulfate substantially all in the form of said monoclinic crystals from the liquid before any substantial redissolution of the precipitated calcium sulfate occurs.

GUSTAVE T. REICH.

REFERENCES CITED

The following references are of record in the file of this patent:

UNITED STATES PATENTS

| Number | Name | Date |
| --- | --- | --- |
| 782,321 | Brothers | Feb. 14, 1905 |
| 2,075,127 | Mead | Mar. 30, 1937 |
| 2,448,051 | Reich | Aug. 31, 1948 |
| 2,464,611 | Reich | Mar. 15, 1949 |